H. FURST.
VALVE FOR EXPLOSION ENGINES.
APPLICATION FILED OCT. 20, 1919.
1,384,058.
Patented July 12, 1921.
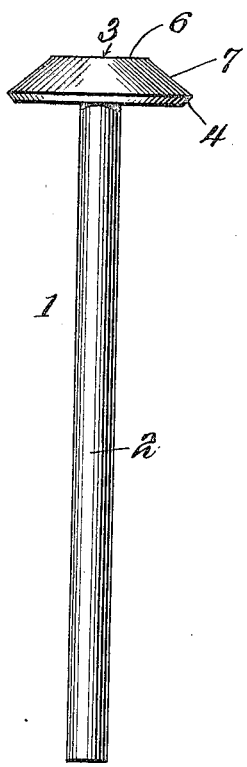
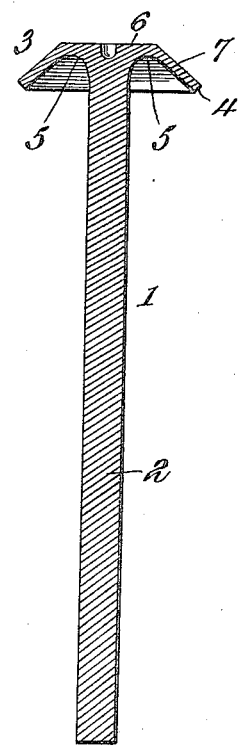
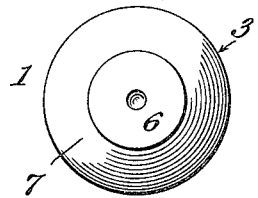
WITNESSES
Howard D. Orr
H. T. Chapman
Herman Furst, INVENTOR,
BY
ATTORNEY

UNITED STATES PATENT OFFICE.

HERMAN FURST, OF REDLANDS, CALIFORNIA.

VALVE FOR EXPLOSION-ENGINES.

1,384,058.  Specification of Letters Patent.  Patented July 12, 1921.

Application filed October 20, 1919. Serial No. 331,953.

*To all whom it may concern:*

Be it known that I, HERMAN FURST, a citizen of the United States, residing at Redlands, in the county of San Bernardino and State of California, have invented a new and useful Improvement in Valves for Explosion-Engines, of which the following is a specification.

This invention has reference to valves for explosion engines and its object is to provide a valve, more particularly for the exhaust ports of explosion engines, which will be highly resistant to the effects of the hot gases of combustion and therefore particularly free from warping, which may be made much lighter and thinner than is customary with such valves, and the head of which may be sufficiently contracted in height to permit its use in engines having shallow combustion chambers.

In accordance with the invention the valve comprises a valve head and a stem which may be either actually or effectively in one piece with the junction of the stem and head broadened to make such junction particularly rigid and strong, while the outer wall of the head is made much thinner than is customary whereby the seating edge of the head is very narrow, so as to be of about the same width as the actual contact area of the valve with the valve seat. The head itself is of frusto-conical form with that face of the head at the end of the stem flat and the side walls of the head, where extending from the flat terminal face, conical and meeting the flat end face at an angle approximating 45°. The conical wall is substantially even thickness throughout with the seating edge, constituting the outer edge of the head, about perpendicular to the conical wall.

The invention will be best understood from a consideration of the following detailed description taken in connection with the accompanying drawings, forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is an elevation of an explosion engine valve embodying the invention.

Fig. 2 is a longitudinal diametric section of the structure shown in Fig. 1.

Fig. 3 is a plan view of the valve shown in Fig. 1.

Referring to the drawings, there is shown a valve 1 of the same general shape and character as the intake and exhaust valves of an explosion engine, such valves being usually alike. The valve comprises an elongated stem 2 and an expanded head 3. The valve stem is made to slide in a guide and is held to its seat by a suitable spring, while the outer edge of the head 3 constitutes a seating edge 4 designed to engage a suitable valve seat, the spring, the guide and the valve seat being omitted from the showing, since these parts may be such as are customarily provided and need no illustration.

The stem 2 is, in the main, the same as is ordinarily employed in valves of the character of the invention. The difference of the valve of the invention over other valves for a like purpose resides in the head 3 and its connection with the stem 2. The head 3 is generally cup-shaped and in cross section is semi-hexagonal and may be forged and turned out of solid steel, suitable fillets 5 being provided on the inner face of the head to prevent crystallization and breaking off of the stem. The upper or outer face 6 of the head is flat and concentric with the stem, while the side wall 7 of the head is conical and meets the flat top 6 at an angle of or closely approximating 45°. The edge 4, at the wide or basic end of the conical wall 7, is also conical and is perpendicular, or nearly so, to the conical wall 7.

The semi-hexagonally shaped valve head permits making the valve head of extremely light construction, for it will not warp under the heat of gases of combustion, even if light and thin and will accommodate itself to expansion and contraction without injury to the valve in any way.

Experience has shown that carbon gives less trouble with the valve than with those of other constructions. Flat valves, that are very prevalently in use at the present time, are simply faced off at the seating edge at an angle that corresponds with the angle of the seat. Such mode of construction leaves considerable metal on the seating face of the valve that never comes into contact with the valve seat at any time. Consequently carbon will collect and pile up on such surplus surface of the seat until it becomes so high or extensive that it will break off and gets between the valve and seat, thereby permitting leakage and destroying compression. Ordinary valves must be frequently ground because of this condition.

In the valve of the invention carbon cannot pile upon the face of the valve since all surplus metal is removed in turning out the cup, leaving only that portion of the edge of the cup that comes in contact constantly with the seat, so that it is absolutely impossible for carbon to accumulate on such angular face.

Moreover, because of the thinness of the slanting wall 7, say about one-sixteenth of an inch, there is a free, unobstructed inlet and outlet, while the junction between the surfaces 6 and 7 being cut off in a hexagonal manner not only adds strength to the valve and makes it unwarpable, but also makes the valve so that it can be operated in the valve chamber of any commercial form of explosion engine.

What is claimed is:

A valve for explosion engines, comprising a one-piece stem and valve head concentric with the stem, said head being semi-hexagonal in diametric cross section, with the top of the head flat and concentric with the stem and joined to the stem by strengthening fillets, said head having a conical side wall joining the flat top at an angle of approximately 45 degrees, whereby the head is of cup-shape, the conical side wall being of substantially even thickness throughout with said thickness corresponding to the extent of contact of the seating edge of the valve with the valve seat.

In testimony that I claim the foregoing as my own I have hereto affixed my signature in the presence of two witnesses.

HERMAN FURST.

Witnesses:
W. A. BREWSTER,
A. E. GROW.